(12) United States Patent
Weisbach et al.

(10) Patent No.: US 8,357,898 B2
(45) Date of Patent: Jan. 22, 2013

(54) THERMAL IMAGING CAMERA

(75) Inventors: Frank Weisbach, Jena (DE); Ingo Kaneblei, Lübeck (DE); Markus Wansing, Lübeck (DE)

(73) Assignee: Dräger Safety AG & Co. KGaA, Lübeck (DE)

(*) Notice: Subject to any disclaimer, the term of this patent is extended or adjusted under 35 U.S.C. 154(b) by 47 days.

(21) Appl. No.: 13/101,386

(22) Filed: May 5, 2011

(65) Prior Publication Data

US 2011/0297828 A1  Dec. 8, 2011

(30) Foreign Application Priority Data

Jun. 7, 2010 (DE) .......................... 10 2010 023 166

(51) Int. Cl.
*H01L 31/00* (2006.01)
(52) U.S. Cl. .................. 250/330; 250/332; 250/334
(58) Field of Classification Search ............ 250/330
See application file for complete search history.

(56) References Cited

U.S. PATENT DOCUMENTS

| | | | |
|---|---|---|---|
| 4,298,887 A * | 11/1981 | Rode ........................ | 348/164 |
| 5,101,108 A | 3/1992 | Gaalema et al. | |
| 5,455,621 A | 10/1995 | Morimura | |
| 5,638,119 A | 6/1997 | Cornuejols | |
| 7,484,885 B1 * | 2/2009 | Carlson et al. ............ | 374/132 |
| 2003/0184827 A1 | 10/2003 | Fleury et al. | |
| 2006/0104488 A1 * | 5/2006 | Bazakos et al. ............ | 382/118 |
| 2007/0211157 A1 | 9/2007 | Humpoletz et al. | |
| 2008/0210872 A1 * | 9/2008 | Grimberg ............ | 250/339.04 |
| 2009/0059039 A1 | 3/2009 | Smith et al. | |

FOREIGN PATENT DOCUMENTS

| | | |
|---|---|---|
| EP | 0980182 A1 | 2/2000 |
| EP | 1 592 235 A1 | 11/2005 |
| GB | 2 435 974 A | 12/2007 |
| JP | 2004-222183 A | 8/2004 |
| WO | 2005/032126 A1 | 4/2005 |

OTHER PUBLICATIONS

Liu, Xinqiao; El Gamal, ABBAS: Photocurrent Estimation from Multiple Non-destructive Samples in a CMOS Image Sensor, Proceedings of SPIE, 2001, p. 450-458, vol. 4306.

* cited by examiner

*Primary Examiner* — Marcus Taningco
(74) *Attorney, Agent, or Firm* — McGlew and Tuttle, P.C.

(57) ABSTRACT

A thermal imaging camera is provided with at least two different sensitivities for alternating reading and with has a device for linking at least two more and less sensitive images read consecutively. The recording and displaying of thermal images makes it possible to combine images with two different dynamic ranges in a common thermal image, wherein the noise and drift of the pixel signals as well as the amount of storage needed for buffering and processing are reduced at the same time. An image buffering unit is designed as a common accumulator (8) for both more sensitive and less sensitive original images (B) and makes available a common output image (A). An image weighting unit (12) is arranged upstream of the accumulator (8) for weighting the more sensitive and less sensitive original images (B) read alternatingly from the detector unit (1) pixel by pixel with a settable percentage weighting function (G) and for weighting the output image (A) being buffered in the accumulator (8) pixel by pixel with a weighting function (I–G) complementary to the settable percentage weighting function as well as for the additive superimposition of the two images (B; A) for the purpose of continuously updating the output image (A).

20 Claims, 6 Drawing Sheets

THERMAL IMAGING CAMERA

CROSS REFERENCE TO RELATED APPLICATIONS

This application claims the benefit of priority under 35 U.S.C. §119 of German Patent Application DE 10 2010 023 166.5 filed Jun. 7, 2010, the entire contents of which are incorporated herein by reference.

FIELD OF THE INVENTION

The present invention pertains to a thermal imaging camera with a pixel-based detector unit, a processor unit and an image buffering unit, wherein the detector unit is designed with at least two different sensitivities and alternating reading of more sensitive and less sensitive images for the pixel-based recording of thermal radiation of a scene imaged onto it and the processor unit is provided for controlling the reading, preprocessing, buffering and linking of at least two consecutive more sensitive and less sensitive images read from the detector unit into a common output image.

BACKGROUND OF THE INVENTION

Various designs of thermal imaging cameras are offered by a number of manufacturers. A "thermal image" is defined, in general, as an image produced by the optical imaging of infrared or thermal radiation.

A thermal image in the near infrared range can be produced technically by the technologies commonly employed for visible light, such as CCD or CMOS sensors. A thermal image in the middle and far infrared ranges is produced by "microbolometers," which are arranged as a matrix of temperature-sensitive resistors and furnish in their entirety a thermal image when the signal inhomogeneities thereof, which are caused by manufacturing tolerances and by self-heating produced by a bias voltage, are corrected.

Thermal imaging cameras consisting of microbolometer components usually contain a pixel array, whose microbolometers permit a temperature-dependent current intensity based on the bias voltage (bias). Microbolometer components arranged in a matrix-like manner are usually also called FPA (Focal Plane Array).

If such a temperature-sensitive detector array is exposed via an infrared optical system, thermal images can be recorded and temperature images can thus be produced.

The following explanations are based on the following terminology for the clear understanding of the technical background.

The image is recorded in so-called "frames." A frame is defined as the data set of the pixel intensity values of the matrix-like detector array (FPA), which are recorded for an image simultaneously. This means that a frame comes into being usually as a result of an individual reading of the entire matrix array. The reading of the image elements arranged in a matrix-like manner is usually performed row by row, and each row is in turn read subsequently column by column. A frame is now the matrix of the pixels (pixel intensities) of a complete reading process. The frame is synonymously also called the currently read image if the entirety of the metrically ordered, read pixel intensities is meant.

"Pixel-based" is defined such that the thermal image is discretized with a certain number and array of positions at which radiation intensities are measured. This is usually a row-column matrix structure, but is not limited to such Cartesian arrays. The processes described here do not presuppose a matrix structure, but also remain valid in case of another array of the pixels. The only thing that is important is that the array is the same when different images are to be compared with one another, for example, thermal image and underground image in case of an underground image correction or thermal images with different thermal sensitivities. Pixel-based means here that a corresponding correction or processing calculation is performed for each pixel position. Parameters such as sensitivity characteristics, etc., can then vary, in the most general case, from one pixel position to another, i.e., they do not have to be equal for the entire thermal image.

The mathematical definition of the terms "(strictly) monotonically rising/falling," "reversibly unambiguous function," "linear/nonlinear function," "(strictly) concave/convex function," etc., is required for the description of function curves of pixel intensities, for both processed, corrected and averaged or weighted signal values.

The term "weighting function" is defined as a set of factors, which is applied to an image data set (frame) as a weighting before the frame thus weighted is subjected to further processing. "Percentage weighting function" is defined here such that the weights shall always be between 0 and 1.

"Pixel intensity" is defined as an intensity value that is assigned to an individual pixel position of the detector matrix. Contrary to this, "image intensity" is defined as intensity data, which are assigned to the image as a whole. There are different possibilities of embodiment for both. How the pixel intensity of the individual microbolometers is usually determined will be described below. If information on the image intensity is needed as a whole, it is possible to form for this, for example, the sum of all pixel intensities. However, other definitions (e.g., mean value of all pixel intensities, sum or mean value of the pixel intensities of one subframe, i.e., of a partial matrix of the entire array or of an ROI="Region of Interest," i.e., of a contiguous partial area of any desired shape of the entire array, etc.) are possible as well.

When using thermal imaging cameras, the temperature differences, which are simultaneously present in a scenery to be recorded by the thermal imaging camera, are often too great to be able to be converted by the dynamic range of the electronic system (approximately linear dynamic level control range of the electronic processing chain used to record, analyze and display the thermal images) into thermal images adequately, i.e., without distortions due to saturation or noise, and they are mostly also too great to be able to be meaningfully interpreted by the user.

One example of this is the use of thermal imaging cameras by firefighters. Both the high temperatures of the source of fire and the low temperatures of humans to be rescued in the area of the fire shall be detected here in the image simultaneously in case of a firefighting mission, so that all the information that makes fast, purposeful action possible can be determined from the thermal image displayed at a glance.

The microbolometer components themselves can be actuated selectively for different sensitivities by controlling the bias voltage or integration time of the individual microbolometers or the transimpedance amplifiers thereof, connected as an integrator, doing so over a very broad temperature range. However, the difficulties lie not primarily in the sensitivity range of the microbolometer components, but in the selection of suitable temperature ranges and a suitable display. It is necessary to avoid both an overmodulation of the images and a reduction of the extent to which all details are encompassed at low temperatures due to small signals being distorted by the noise of the individual microbolometers because the (strictly monotonically rising) dynamic range is tuned to high temperatures.

The efforts are therefore aimed at alternatingly generating two thermograms each, recorded with higher and lower sensitivity and displaying them together in a suitable manner on a display in order to obtain a non-overmodulated image encompassing all details at both high and low temperatures.

To distinguish the two thermal images, which were recorded with markedly different sensitivities of the FPA, the terms "more sensitive image" and "less sensitive image" will be used below, and one also speaks of "images of medium sensitivity" in case of more than two images that are recorded with different detector sensitivity settings.

It is already known in the state of the art from GB 2 435 974 A that two alternatingly recorded thermograms can be displayed in a common image. However, the thermograms recorded there alternatingly with higher and lower dynamics are buffered individually and the two images are then sent to a common display. This procedure has the drawback that it is highly memory-intensive and requires additional memory bandwidth. Furthermore, the buffering delays the image sequence compared with a direct signal processing by one or more frames. The so-called pipeline delay increases, which is extremely undesirable for real-time applications.

A general method for the use of more sensitive and less sensitive pixels is described, for example, in JP 2004-222183 A, wherein the camera, which is equipped with more sensitive and less sensitive pixels, has an input unit for an exposure correction value, on the basis of which the images of different sensitivities are taken into account with an exposure value and fitted together into a combined image and which is used to expand or restrict the dynamic range.

A thermal imaging system, which is known from US 2007/0211157 A1, operates on a very similar basis. Repeated switchings between two sensitivity settings of the detector array are likewise performed in this solution, and the suitable sensitivity level is selected pixel by pixel with the use of a threshold value criterion and displayed.

It is disadvantageous in both cases that a quasi-simultaneous parallel processing of the two images recorded with different sensitivities must be performed, and the combination of the image data pixel by pixel depends on arbitrarily set or empirically found correction values or threshold values, which must either be adapted continually to the current thermal scenery or preselected on the basis of certain criteria.

SUMMARY OF THE INVENTION

The basic object of the present invention is to find a new possibility of recording and displaying thermal images, which makes it possible to combine images with two different dynamic ranges in one common thermal image, where noise and drift of the pixel signals as well as the amount of memory needed for buffering and processing are reduced at the same time.

According to the invention, a thermal imaging camera is provided with a pixel-based detector unit, a processor unit and an image buffering unit, wherein the detector unit is designed for the pixel-based recording of thermal radiation of a scene imaged onto it with at least two different sensitivities and alternating reading of more sensitive and less sensitive images. The processor unit is provided for controlling the reading, preprocessing, buffering and linking of at least two consecutive more sensitive and less sensitive images read from the detector unit into a common output image, the object is accomplished according to the present invention by the image buffering unit being designed as a common accumulator for both more sensitive and less sensitive original images and providing at its output the common output image and by an image weighting unit being arranged upstream of the accumulator for weighting the more sensitive and less sensitive original images read alternatingly from the detector unit pixel by pixel with a settable percentage weighting function G and for weighting the output image buffered in the accumulator pixel by pixel with a weighting function (I–G) complementary to the settable percentage weighting function as well as for the additive superimposition of the two images for the continuous updating of the output image on the basis of original images read alternatingly from the detector unit with at least two different sensitivity settings.

A sequence of more sensitive and less sensitive original images read alternatingly from the detector unit with more than two different sensitivity settings is advantageously sent to the accumulator in the weighted form, the updating always taking place on the basis of the complementarily weighted output image made currently available in the accumulator, so that a common output image with pixel intensities from at least three original images having different sensitivities can be produced in the accumulator.

It is likewise advantageous to feed to the accumulator a sequence of more sensitive and less sensitive original images read alternatingly and consecutively from the detector unit with at least two sensitivity settings in the weighted form, the updating always taking place on the basis of the complementarily weighted original images made currently available in the accumulator, so that a slidingly averaged output image of the sequence of alternatingly recorded, more sensitive and less sensitive images is obtained.

In a first variant, the image weighting unit preferably has an image weighting multiplier for weighting the read original images with the settable percentage weighting function G, an accumulator weighting multiplier for weighting the output image present from the accumulator with the complementary weighting function (I–G), as well as an adder for the pixel-by-pixel addition of the two weighted images, to which the weighted image of the read original image as well as the complementarily weighted output image present in the accumulator are sent and whose output is followed downstream by the accumulator.

In a preferred second variant, the image weighting unit is composed, consecutively, of a first accumulator adder, to which the original image read from the detector unit with defined sensitivity as well as the output image present in the accumulator are sent in order to form pixel-by-pixel differences from the original image and the output image, a downstream image weighting multiplier for weighting the differential image thus formed with the settable weighting function G as well as an image adder, to which the weighted differential image from the original image and the output image from the weighting multiplier and the output image present in the accumulator are sent, in order to achieve the complementary weighting of the output image present in the accumulator against the new original image.

The weighting function G is different for more sensitive and less sensitive images, a selecting unit being provided for making available different weighting functions for the read original image depending on the detector sensitivity set as well as corresponding to adapted complementary weighting functions (I–G).

The processor unit advantageously has means for controlling the weighting of the pixel intensity of each pixel position of a more sensitive image with a first weighting factor of the first percentage weighting function and the weighting of the pixel intensity of each pixel position of one or more less sensitive images with a second weighting factor or additional weighting factors of the second or additional percentage weighting functions, wherein the first, second and additional weighting functions can be applied, in an assigned manner, to the different, more sensitive and less sensitive images.

The detector unit has, preferably based on its different sensitivity settings, a minimum possible intensity and a maximum possible intensity for each pixel of a more sensitive image and a minimum possible intensity and a maximum possible intensity for each pixel of a less sensitive image, the first percentage weighting function having a monotonic drop from a first maximum percentage weight at the minimum possible intensity to a first minimum percentage weight at the maximum possible intensity, and the second or additional percentage weighting function shows a monotonic rise from a second minimum percentage weight at the minimum possible intensity to a second maximum percentage weight at the maximum possible intensity.

The detector unit preferably has a lower switching threshold intensity between the minimum possible intensity and the maximum possible intensity for each pixel of a more sensitive image and an upper switching threshold intensity between the maximum possible intensity and the minimum possible intensity for each pixel of a less sensitive image, wherein the first percentage weighting function is essentially constant below the lower switching threshold intensity and has a monotonic drop from a first maximum percentage weight at the lower switching threshold intensity above the lower switching threshold intensity to a first minimum percentage weight at the maximum possible intensity, and the second percentage weighting function has a monotonic rise below the upper switching threshold intensity from a second minimum percentage weight at the minimum possible intensity to a second maximum percentage weight at the upper switching threshold intensity and is essentially constant above the upper switching threshold intensity.

Furthermore, the detector unit advantageously has a lower switching threshold intensity between the minimum possible intensity and the maximum possible intensity for each pixel of a more sensitive image and an upper switching threshold intensity between the maximum possible intensity and the minimum possible intensity for each pixel of a less sensitive image, wherein the first percentage weighting function has a monotonic rise from a first lower minimum percentage weight to a first maximum percentage weight below the lower switching threshold intensity and a monotonic drop from the first maximum percentage weight at the lower switching threshold intensity to a first upper minimum percentage weight at the maximum possible intensity above the lower switching threshold intensity up to the maximum possible intensity, as well as the second percentage weighting function has a monotonic rise from a second lower minimum percentage weight at the minimum possible intensity to a second maximum percentage weight at the upper switching threshold intensity between the minimum possible intensity and the upper switching threshold intensity and a monotonic drop from the second maximum percentage weight at the upper switching threshold intensity to a second upper minimum percentage weight at the upper switching threshold intensity to a second upper minimum percentage weight at the maximum possible intensity above the upper switching threshold intensity.

The lower switching threshold intensity is preferably equal to the upper switching threshold intensity. At least one of the monotonic drops and rises of the weighting functions is a convex function according to an advantageous first variant. However, at least one of the monotonic drops or rises may also be a linear function.

The maximum percentage weight for a pixel of a more sensitive or less sensitive image is advantageously set at a higher percentage weight if the difference in the value of its pixel intensity from the intensity of the corresponding pixel in the accumulator is above a shut-off threshold value. The higher percentage weight is preferably 100%.

The present invention is based on the basic consideration that thermograms recorded alternatingly with higher and lower sensitivity (dynamics), which are buffered individually and then taken into account for a common display, introduce their individual noise components and signal fluctuations (drift over time) into the common output image in a cumulatively amplified form and must be corrected in this respect individually before they are taken into account. The present invention therefore makes use of an iteratively updated buffer memory (accumulator), in which the more sensitive and less sensitive images are taken into account alternatingly only proportionally (i.e., in a weighted form) with the likewise weighted predecessor image (output image) already present in the buffer memory.

Two effects are achieved with the solution being described: On the one hand, more sensitive and less sensitive images are mixed in proportion to their weights and thus combined into a common output image. On the other hand, their weighting in relation to the current output image brings about a suppression of variations in time of the pixel intensity (noise). This effect results from the fact that every individual image contributes to the output image with a certain percentage only by the image being updated in the sense of sliding mean values for the individual pixel intensities. Moreover, the use of the so-called accumulator eliminates the separate buffering of each of the individual images read alternatingly with higher sensitivity and lower sensitivity, which means both a reduction in the number of components and cost savings as well as a rather substantial technical facilitation, because the storage accesses can be reduced by half compared with the high clock speed, which is electronically demanding in case of two buffering units.

It is possible with the solution according to the present invention to embody a new type of recording and displaying thermal images, in which two thermal images recorded with different dynamic ranges can be combined in a common output image, and the noise of the pixel signals as well as the amount of memory needed for buffering and processing are reduced at the same time.

The present invention shall be explained in more detail below on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
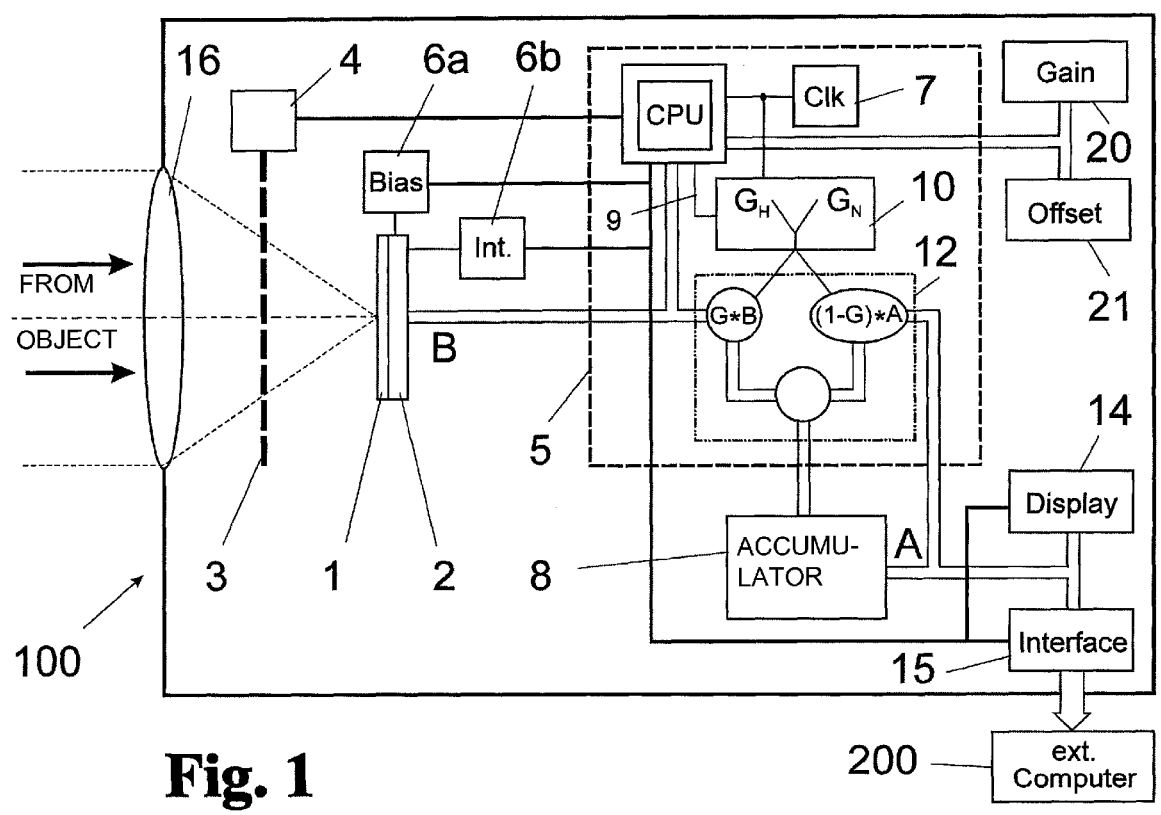
FIG. 1 is a schematic view showing an embodiment of the thermal imaging camera according to the present invention.

Referring to the drawings in particular, FIG. 1 shows the components of a thermal imaging camera according to one embodiment of the present invention and the networking thereof. To record a thermal image, IR radiation is imaged by means of an IR optical system 16 onto a matrix-like detector unit 1—hereinafter also called FPA (Focal Plane Array)—which is read as a complete frame in a pixel-based manner by means of the corresponding reading unit 2 and is transmitted as an original image B of the imaged thermal scene.

A processor unit 5 actuates a shutter unit called shutter 3 for opening or closing the imaging ray path by means of a shutter control 4. An original image B is produced with the shutter 3 opened.

With the shutter 3 closed, a background image of the shutter 3 is produced as a reference, which is used to compensate inhomogeneities of the microbolometer components of the FPA 1 ("non-uniformity correction" NUC, not being considered here in more detail).

Processor unit 5 controls, furthermore, the bias voltage of the microbolometers of the FPA 1 via a bias voltage generator 6a or the integration time by means of the integration time presetting unit 6b via the reading unit 2. Both by selecting the bias voltage and by selecting the integration time, the reading unit 2 can be operated such that a more sensitive or a less sensitive image is alternatingly formed as an original image B. Process unit 5 is subject, besides, to a clock control 7 and recurrently generates, in a certain sequence, more sensitive and less sensitive original images B as well as background images, the latter being used as a reference signal for the continuous calibration of the microbolometers or for standardizing the pixel intensities.

Processor unit 5 sends, furthermore, a selection signal 9 for a more sensitive or less sensitive image to further components of the camera in order to inform them on whether the original image B being currently measured is a more sensitive image or a less sensitive image. Depending on this signal, a selection unit 10 for the percentage weighting function G selects a weighting function $G_H$ for a more sensitive image (first percentage weighting function) or a weighting function $G_N$ for a less sensitive image (second percentage weighting function). A "percentage weighting function" means here that the weights are always represented by factors between 0 and 1.

The weighting function G (or separate weighting functions $G_H$, $G_N$ for the more sensitive image and for the less sensitive image) affects in an image weighting multiplier 11a the original images B according to $$B'_{ij} = G \cdot B_{ij}$$

for all i, j (row and column index, respectively) pixel by pixel with a weighting factor in order to produce a weighted image B'.

The thermal imaging camera 100 has, furthermore, only one image buffering unit called an accumulator 8. Accumulator 8 is continuously updated by the more sensitive and less sensitive images B' read alternatingly from the detector 1. A weighted current accumulator image A' is calculated for this by the accumulator weighting multiplier 11b weighting the current output image A of the accumulator 8 (which is also the current output image A for display 14 and/or interface 15) likewise with the use of the weighting function G (or separate weighting functions $G_H$ and $G_N$ for the more sensitive image and the less sensitive image), but with the complementary weighting function (I−G), which is again to be used pixel by pixel, i.e., according to $$A'_{ij} = (I-G) \cdot A_{ij}.$$

An image adder 13 subsequently adds up the weighted image B' and the complementarily weighted current accumulator image A' pixel by pixel. The result $$A_{ij,n+1} = G \cdot B_{ij,n+1} + (I-G) \cdot A_{ij,n}$$

is entered into accumulator 8 as a new accumulator image $A_{n+1}$.

The processor unit 5 can access, furthermore, a gain buffer 20 and an offset buffer for both reading and writing. These buffers 20 and 21 for gain and zero deviation (offset) are preferably defined each as memories for value arrays, because gain and offset are individually different for each pixel position in the normal case. However, they may also be designed as memories for individual values.

Gain and offset are preferably used for a two-point correction for thermal images and background images. These corrections may take place pixel by pixel individually or uniformly for all pixel positions. The values or value matrices for the gain are usually preset as fixed values as a factory calibration, but they may also be set during the ongoing camera operation. The offset or offset matrix is usually determined in the thermal imaging camera during the ongoing mode of operation.

It shall be noted, furthermore, that the processor unit 5 can perform a two-point correction or other calculation with gain and offset values on the directly measured thermal image frames (original images B) or background frames (background reference) as well as on the already weighted images B'. Any meaningful combination is equally possible here, because the units are connected to one another quasi by a data bus.

Figure 2A:
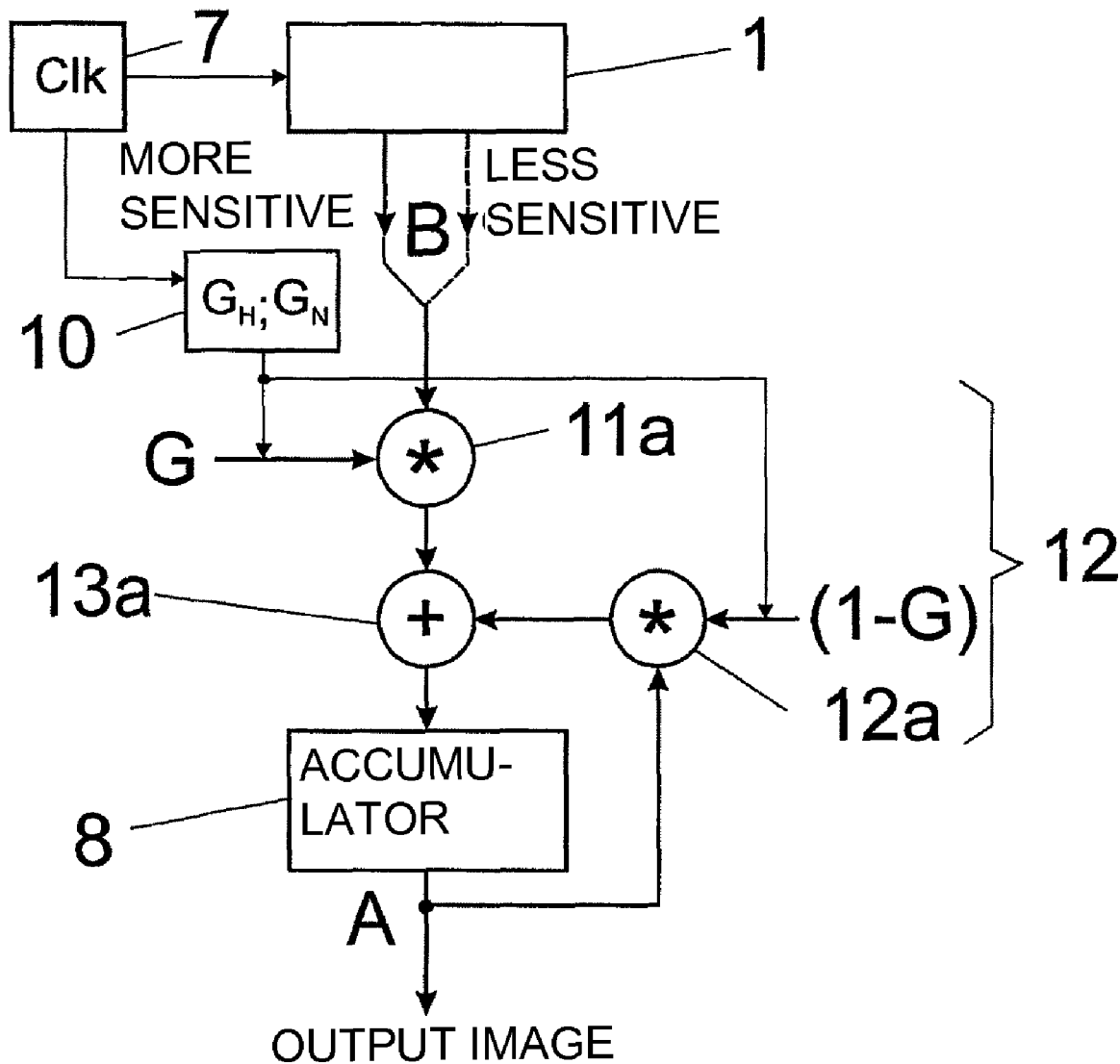
FIG. 2a is a flow chart view showing a process of updating the accumulator.
Figure 2B:
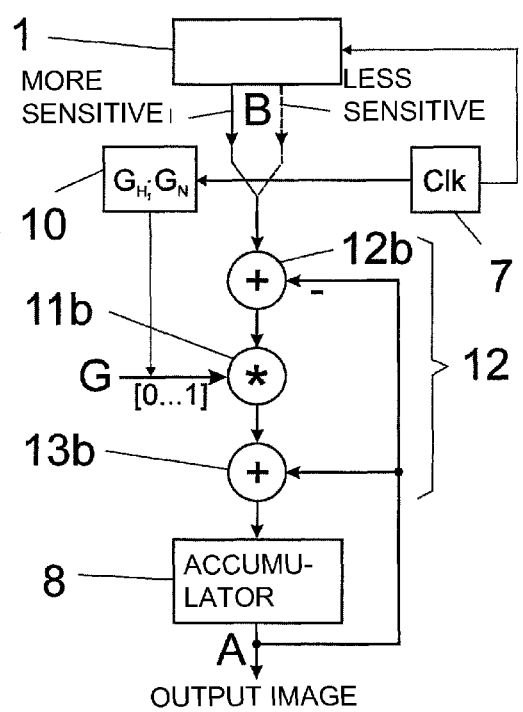
FIG. 2b is a flow chart view showing an alternative embodiment of the process of updating the accumulator.

FIG. 2a shows the successive updating of the accumulator 8 as a simple schematic flow chart with the percentage weight G and the weight derived therefrom (I−G). FIG. 2b shows an alternative embodiment, which yields mathematically the same result as the embodiment in FIG. 2a.

The calculation of the new output image being buffered in accumulator 8 is carried out here according to the formula $$A_{ij,n+1} = A_{ij,n} + G \cdot (B_{ij,n+1} - A_{ij,n}).$$

Adder 12b now forms the difference between the original image $B_{n+1}$ outputted by the FPA 1 and the output image $A_n$ present in accumulator 8. The image weighting multiplier 11b weights the difference of the two images by means of the weighting function G (more exactly, by means of weighting functions $G_H$ and $G_N$ set separately for the more sensitive image and the less sensitive image, as they are indicated as examples in FIGS. 4a-4c) and sends them to the image adder 13b. This adds up the difference thus weighted and the output image $A_n$ present in accumulator 8. The result is then entered as a new output image $A_{n+1}$ into accumulator (8), from which it can be displayed in display 14 or sent to the interface 15 for further processing in an external computer 200.

The advantage of this embodiment is that only one multiplier is needed and the substantial quantity of pixel-by-pixel operations can be performed as simple addition steps with the same basic function, as in the basic variant according to FIG. 2a.

Figure 2C:
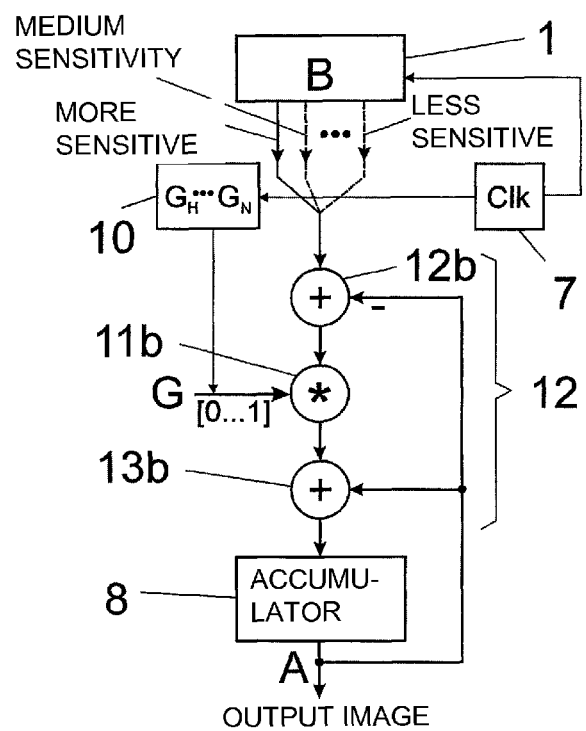
FIG. 2c is a flow chart view showing an alternative embodiment of the process of updating the accumulator.

The variant according to FIG. 2c is based on the simplified processing according to FIG. 2b and shows the possibility that a plurality of original images B, which are read alternatingly at three or more different settings of the detector sensitivity of the FPA 1, can also be linked with output images A for buffering and updated in the same manner with the two adders 12b and 13b indicated above as well as with only one image weighting multiplier 11b in only one accumulator 8.

A buffering unit called accumulator 8 is used during image processing rather than recording first two images of different sensitivities quasi-simultaneously, buffering them and then taking them into account with one another to form the common output image A.

The FPA 1 as a detector unit is actuated now by the processor unit 5 such that it alternatingly always produces a more sensitive image and a less sensitive image (and also a background image at a certain time interval with the shutter 3 closed). Therefore, one of the more sensitive and less sensitive images read alternatingly is always exactly present at a given point in time (outside the time during which shutter 3 is closed) together with the information on whether the image is a more sensitive image or a less sensitive image.

This read original image B is weighted pixel by pixel with the percentage weighting function G and linked with the accumulator image A being stored in the accumulator 8. The linking is performed by the pixel-by-pixel addition of the weighted image B' with a weighted accumulator image A', which was produced by the pixel-by-pixel multiplication of the existing accumulator content by the 100% complementary portion of the weighting function G, i.e., by the weighting (1−G). As a result of the addition, an output image A is formed, with which the content of accumulator 8 is at the same time updated, i.e., the new accumulator image A is iteratively continuously updated in each step, namely, when reading a more sensitive image, with this image, and when reading a less sensitive image, with such an image. A separate and parallel buffering of more sensitive and less sensitive images is avoided hereby and memory space is thus saved. It shall be mentioned that a weighting function $G_H$ is used for the more sensitive image and a weighting function $G_N$ is used for the less sensitive image, and these weighting functions are usually different from each other.

The weighted updating of the accumulator 8 makes it, furthermore, possible to slidingly average short-term fluctuations of the image intensity over a plurality of images and thus to markedly reduce variations in the output image (noise) over time. The intensity of this "sliding averaging" can be set by selecting the weights of the weighting functions and hence the number of original images B used for the averaging.

Consequently, what happens according to the present invention is not simply a mutual combination and outputting of a more sensitive image and a less sensitive image. The accumulator 8 rather collects, as a rule, information from a plurality of original images B, which will then be contained in the current output image A with respective different weights. The weight percentages of more sensitive and less sensitive images in the accumulator 8 may be different now. The ratio of the weight percentages corresponds to a certain mixing ratio of more sensitive and less sensitive original images B.

Since the weights $G_H$ and $G_N$ do not have to be constant, but are typically functions of the pixel intensity each, the weight percentages of more sensitive and less sensitive images may also vary from one pixel to another.

However, by correspondingly selecting the weights $G_H$ and $G_N$, the accumulator 8 can also be operated such that only one more sensitive and less sensitive original image B each is taken into account, or that all pixels have the same weight.

The processing structure of the processor unit 5 with the image weighting unit 12, comprising the multipliers 11a and 12a and the adder 13a, forms, together with the accumulator 8, a recursive, time-discrete (cycled) low-pass filter (also called IIR low-pass filter industrially). Its action corresponds approximately to that of a continuous filter with the time constant $t_F/G$ ($t_F$=frame or clock time, G=weighting factor $G_H$ or $G_N$). Variations in the pixel intensity over time (noise) are averaged hereby and thus suppressed. The weights $G_H$ and $G_N$ consequently determine not only the mixing ratio of more sensitive image to less sensitive image, but also the intensity of the noise suppression.

$G_H$ and $G_N$ do not have to be constant, but may also vary with the pixel intensity. The filter action can thus be controlled depending on the pixel intensity. On the whole, the goal of adapting noise suppression to the noise characteristic present is pursued here. Detector 1 has more noise at low temperatures (and hence small signals) than at high temperatures (and hence large signals).

The filter becomes faster with increasing weighting factor. At G=100%, a pixel of the current original image B is written with the next frame into the accumulator 8 immediately and without averaging. The low-pass filter can be made inactive in this manner if no filter action is desired. This "shutting off" may also take place pixel by pixel.

Figure 5:
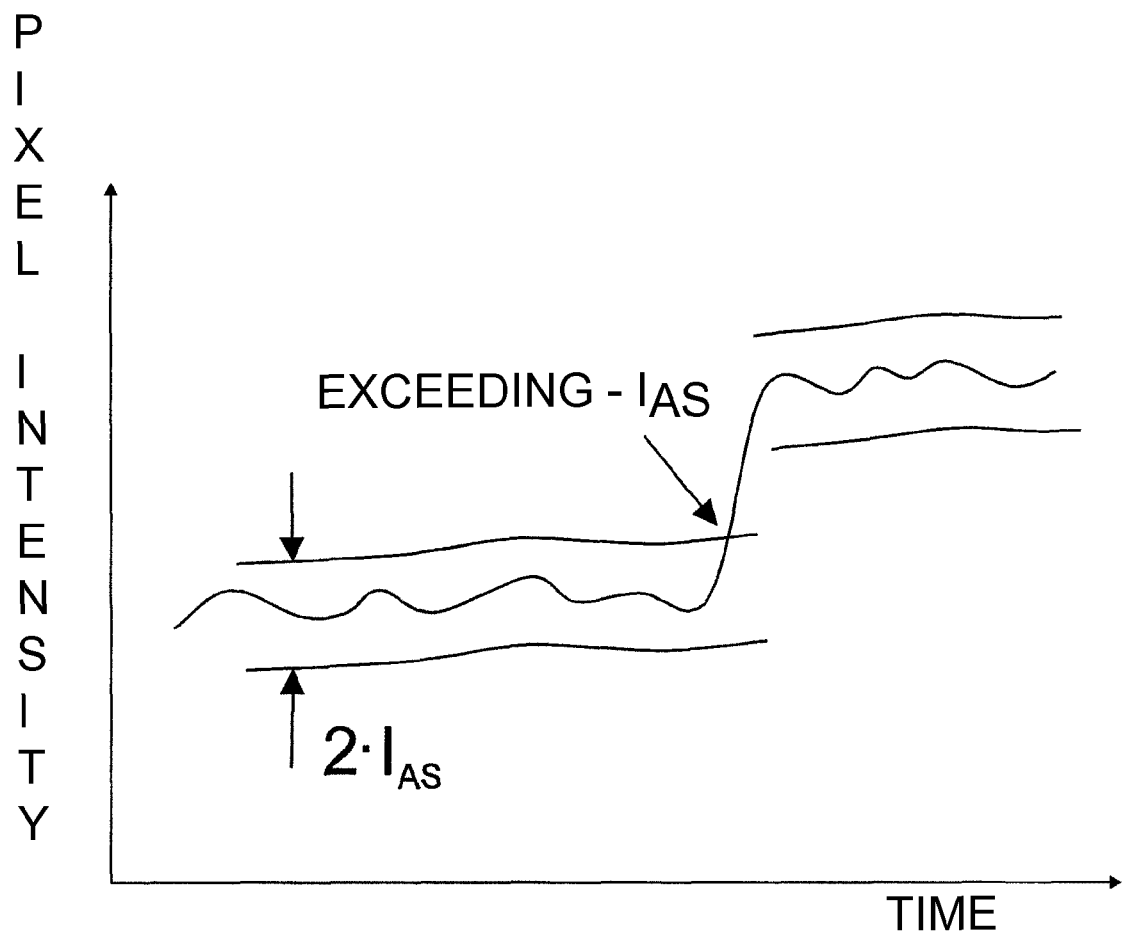
FIG. 5 is a graph showing an embodiment of a fast switching of the weighting function in case of an abrupt change in the temperature conditions over time.

If there are, for example, fast changes in the thermal image (due to moving objects or as a consequence of camera pan), individual pixels could not be able to follow these changes fast enough, and object contours would have a tail. To avoid this, the weight of a pixel is set at a higher percentage weight (e.g., 100%) in one embodiment of the present invention if the difference in the value of its pixel intensity from the intensity of the corresponding pixel in the accumulator 8 is above a shut-off threshold value $I_{AS}$. The pixel µs thus written into the accumulator 8 more rapidly (or immediately and without averaging). The shut-off threshold value $I_{AS}$ is typically set just slightly above the extent of variations caused by the noise, so that the low-pass filter acts only selectively for noisy pixels, which are located in a "hose" having a width of $2*I_{AS}$, but not for pixels that change rapidly based on objects in the thermal image (FIG. 5).

It is obvious, furthermore, that the processor (CPU) in the processor unit 5 can also perform all image calculations. No separate components need now be provided for the image calculations.

The current accumulator content is sent as an output image A to a display 14 and/or a computer interface 15 in order to output it in a visible form for the user or to archive it in an external computer 200 or to subject it to further processing in another manner.

Other parameters can also be transmitted via the computer interface 15 between the thermal imaging camera 100 and external computer 200 in one direction or both directions. For example, the external computer 200 may preset parameters of the thermal imaging camera 100, or the thermal imaging camera 100 may also transmit parameters or other measured variables, e.g., the substrate temperature of the microbolometer component, besides the output image A, to the computer.

To obtain thermal images with different sensitivities, the sensitivity of the FPA 1 is actuated alternatingly in two different manners by at least one of the three influencing factors bias voltage, gain and integration time such that the FPA 1 becomes either more sensitive or less sensitive. However, the methods described here do not depend on the type of sensitivity setting, but may also be embodied with any other type of sensitivity setting. The only thing that is important is that there is an image recording with two different sensitivity settings.

The image recording is performed by means of a detector unit 1 comprising microbolometers, whose electric resistance changes as a function of the temperature and which have pixel-based, temperature-sensitive structures, e.g., structures consisting of amorphous silicon. To measure the electric resistance, a bias voltage is applied, as a rule, to each microbolometer, and each microbolometer is connected via a FET switch to the input of an integrating transimpedance amplifier (not shown) by a clearing signal applied from the outside.

The gain of the transimpedance amplifier can be set from the outside if needed. The integration time may likewise be varied by the user within certain limits. The sensitivity of the detector unit 1 can be controlled, in principle, by each of the three influencing factors bias voltage, gain and integration time.

It is, furthermore, common practice to operate a measuring bolometer and a blind bolometer in a bridge circuit.

Figure 3A:
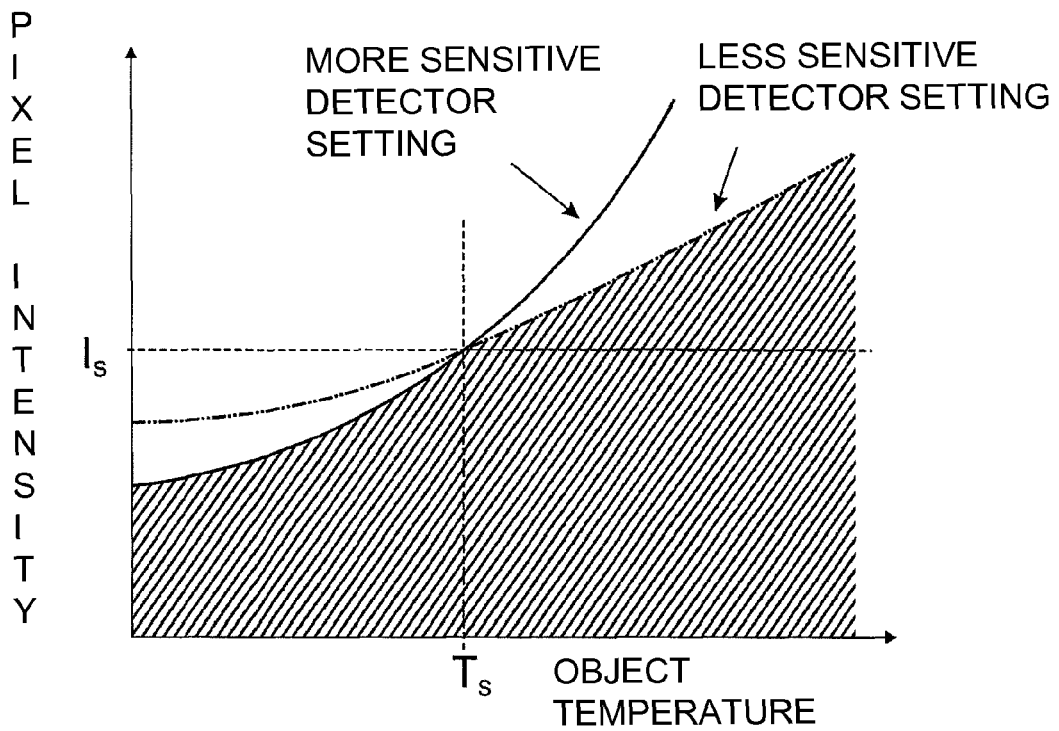
FIG. 3a is a graph of detector characteristics for more sensitive and less sensitive detector settings as pixel intensities over the temperature of the scene being imaged.
Figure 3B:
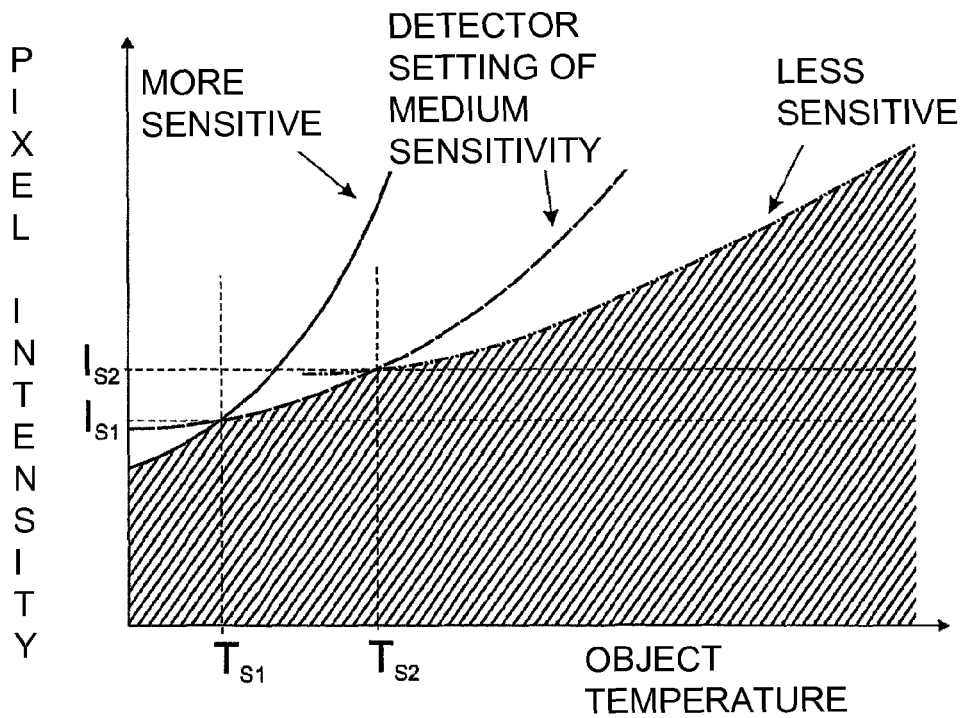
FIG. 3b is another graph of detector characteristics for more sensitive and less sensitive detector settings as pixel intensities over the temperature of the scene being imaged.

FIGS. 3a and 3b show the signal intensity of a pixel (pixel intensity) for the higher and lower sensitivity settings of the detector unit 1 according to the present invention. FIGS. 3a and 3b show a characteristic for high temperatures, which is present in case of a detector setting for producing low-sensitivity images, and a characteristic for low temperature, which can be observed at a detector setting for producing more sensitive images. The characteristics intersect at point $T_S$, $I_S$.

The sensitivity of the detector decreases rapidly in the low-sensitivity range at object temperatures under the intersection $T_S$. The weight $G_N$ is therefore reduced and weight $G_H$ is increased at pixel intensities below $I_S$, so that the more sensitive characteristic will become increasingly active in the output image.

By contrast, there is a risk at object temperatures above the intersection $T_S$ that the detector will be overmodulated or will become saturated in the more sensitive range. Weight $G_H$ is therefore reduced and weight $G_N$ is increased at pixel intensities above $I_S$, so that the less sensitive characteristic will increasingly become active in the output image.

However, the intensity of noise suppression can also be controlled by means of the weights $G_H$ and $G_N$. $G_H$ and $G_N$ may assume any desired value between 0 and 100%. It is permissible for the sum of $G_H$ and $G_N$ to be unequal to 100%, and this has no effect on the mean value of the pixel intensities of the output image. It is likewise unnecessary in this connection for there to be a certain ratio of $G_H$ to $G_N$, for example, it is unnecessary for $G_H$ and $G_N$ to be equal. The two weights act independently from one another. The output image would not be updated only in the case in which both weights equal 0, and the last image will be visible as a permanent still image.

To simplify the following explanations for the application of weighting functions to the images with different sensitivity settings of the detector unit 1, "first" functions, influencing variables and parameters will be introduced below for the more sensitive image and "second" functions, influencing variables and parameters will be introduced for the less sensitive image.

Figure 4A:
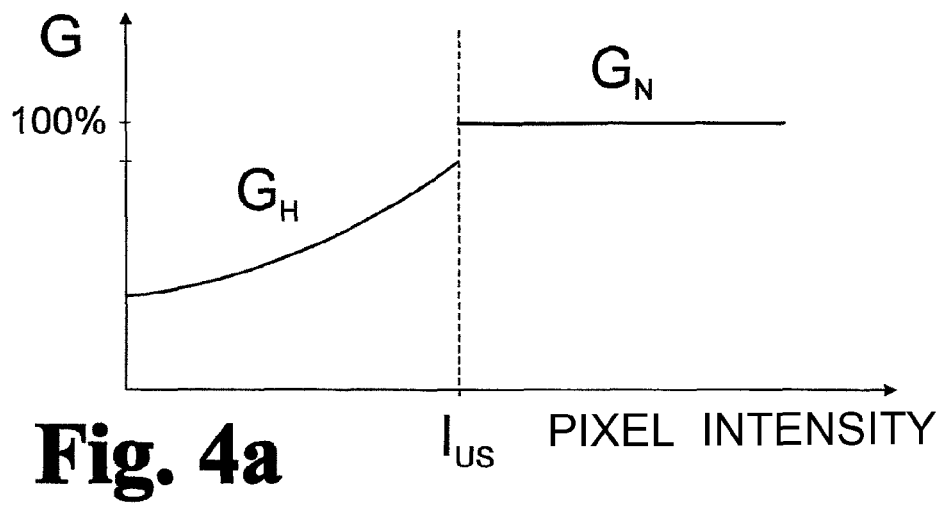
FIG. 4a is a graph showing an embodiment of the weighting of the pixel intensity of a pixel for high temperature and low temperature by switching over the weighting functions on the basis of a defined switching threshold intensity.

Separate percentage weighting functions are provided in FIG. 4a for the more sensitive image and the less sensitive image on the basis of the characteristic curves according to FIGS. 3a and 3b. A first percentage weighting function $G_H$ is decisive for the more sensitive image and a second percentage weighting function $G_N$ is used for the less sensitive image. These different weighting functions $G_H$ and $G_N$ are to be used each alone for certain intervals of the pixel intensity, at which either only the more sensitive image or only the less sensitive image shall be represented. A switching threshold value $I_{US}$, at which a switching over is carried out between the weighting functions $G_H$ and $G_N$, is set for this purpose in the explanation to FIG. 4a at the pixel intensity $I_m$, at which the characteristics of the higher and lower sensitivity settings of the detector unit 1 intersect. The weighting functions $G_H$ and $G_N$ do not have to have an equal or constant function curve or an equal percentage level.

FIG. 4a shows an example of how the noise, which increases towards low intensities, can be compensated by means of the weighting function $G_H$. The curve of $G_H$ is selected now to be such that it approximately follows the curve of the rise of the more sensitive characteristic from FIGS. 3a and 3b. The weights $G_H$ and $G_N$ may, but do not have to, rise to 100%. The "seamless" switching over between the weighting functions $G_H$ and $G_N$ at the pixel intensity $I_m=I_m$ is, in principle, a meaningful and especially uncomplicated variant to satisfactorily achieve the sliding averaging of the output image A according to the present invention with alternatingly weighted updating of the output image A produced last in the accumulator 8 (as an image buffer unit).

Figure 4B:
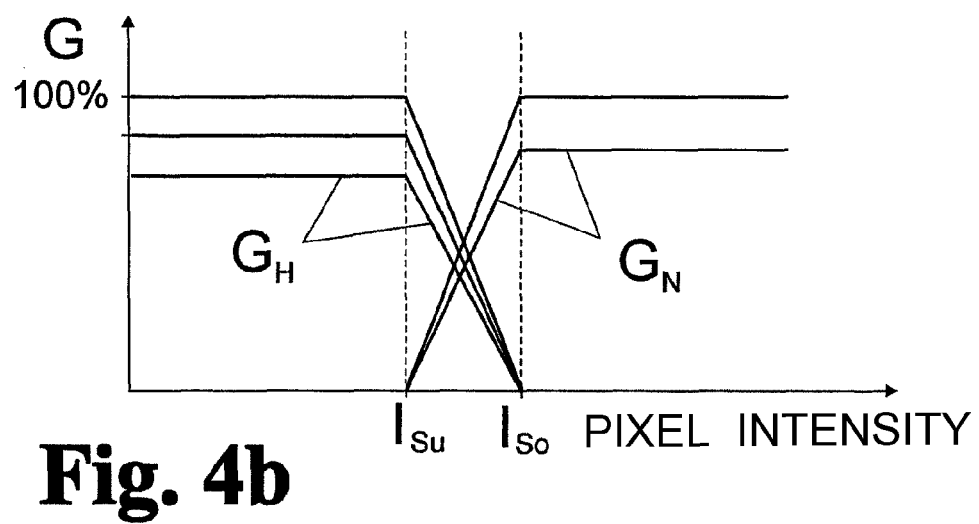
FIG. 4b is graph showing a percentage weighting function in one embodiment of the present invention.

In one embodiment of the present invention, FIG. 4b shows a complementary intermeshing of the two percentage weighting functions $G_H$ and $G_N$ for the more sensitive image and the less sensitive image. The percentage weighting functions $G_H$ and $G_N$ represent a plateau, i.e., are constant, for certain intervals of the pixel intensity, at which either the more sensitive image or the less sensitive image shall be represented alone. In a transition range, the first weighting function $G_H$ for the more sensitive image will then drop strictly monotonically to zero, and the weighting function $G_N$ for the less sensitive image will rise strictly monotonically from zero, until it reaches a plateau itself. It is ensured with the plateau ranges of the two respective weighting functions $G_H$ and $G_N$ that always only the percentage weighting function $G_H$ or $G_N$ that is applicable to these ranges is active in ranges of very high or very low pixel intensities. The plateau of the more sensitive weighting function and the plateau of the less sensitive weighting function may, but do not have to, agree, as was explained in connection with FIG. 4a.

As can be recognized from FIG. 4b, a first percentage weighting function $G_H$, which has a strictly monotonic drop from a first maximum percentage weight at the minimum possible pixel intensity to a first minimum percentage weight at the maximum possible pixel intensity, is decisive for the more sensitive image in a certain range of the pixel intensities, whereas the second percentage weighting function $G_N$ has a monotonic rise from a second minimum percentage weight at the minimum possible pixel intensity to a second maximum percentage weight at the maximum possible pixel intensity for the less sensitive image in the same interval of the pixel intensities.

As can also be seen in FIG. 4b, the second percentage weighting function $G_N$ is provided with a plateau, which weights all intensity values uniformly with the same percentage in a corresponding argument range. The first percentage weighting function has only one peak. The intermeshing of the two weighting functions $G_H$ and $G_N$ is now achieved such that $G_H$ drops monotonically to 0 from the peak, while $G_N$ rises monotonically from 0 to the plateau. A discontinuous, abrupt transition between the two detector characteristics, which is obtained in case of a simple switching over of the characteristics when the intersection of these characteristics does not exactly agree with the switching point, is avoided in this manner.

This can be concretely embodied such that the detector unit 1 has, for each pixel of the more sensitive image, a minimum possible pixel intensity, a maximum possible pixel intensity as well as a lower switching threshold intensity $I_{Su}$ between these two. The first percentage weighting function $G_H$ is essentially constant (plateau) between the minimum possible intensity and the lower switching threshold intensity $I_{Su}$. Between the lower switching threshold intensity $I_{Su}$ and the maximum possible intensity, i.e., intensity detectable without overmodulation, the first percentage weighting function $G_H$ has a strictly monotonic drop from a maximum percentage weight at the lower switching threshold intensity $I_{Su}$ to a minimum percentage weight at the maximum possible intensity.

In a correspondingly complementary manner, the detector unit 1 has a minimum possible intensity for each pixel of the less sensitive image, i.e., an intensity still detectable above the noise, a maximum possible intensity as well as an upper switching threshold intensity $I_{So}$ between these two. Between the minimum possible intensity and the upper switching threshold intensity $I_{So}$, the second percentage weighting function $G_N$ has a strictly monotonic drop from a minimum percentage weight at the minimum possible intensity to a maximum percentage weight at the upper switching threshold intensity $I_{So}$. The second percentage weighting function $G_N$ is then essentially constant (plateau) between the upper switching threshold intensity $I_{So}$ and the maximum possible intensity.

Figure 4C:
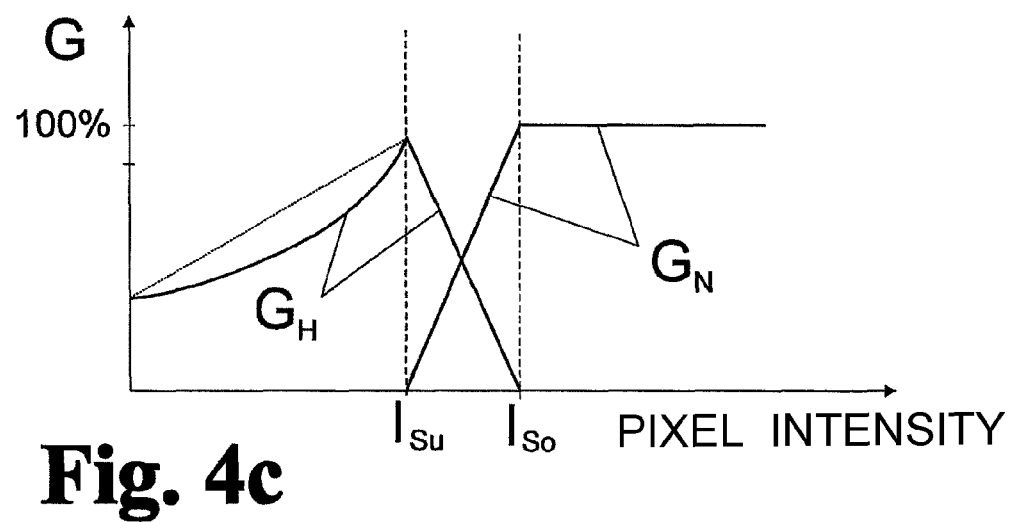
FIG. 4c is a graph showing a percentage weighting function in another embodiment of the present invention.

FIG. 4c shows the percentage weighting functions $G_H$ and $G_N$ in another embodiment of the present invention. Even though it is likewise ensured in this embodiment by a monotonic rise of the first weighting function $G_H$ from zero or by a monotonic drop of the second weighting function $G_N$ to zero that the transition between the two characteristics of the detector sensitivity settings takes place softly, on the one hand, only one of the two characteristics is active, on the other hand, for very high or very low temperatures, i.e., outside the transition range.

However, the weighting function $G_H$ has no pronounced plateau any more in its sole range of validity according to FIG. 4c, but it is described in the lower range of the pixel intensity permissible for the more sensitive detector setting by a strictly monotonically rising convex function, which is used, as in FIG. 4a, for an additional noise reduction. Beginning from the lower switching threshold intensity $I_{Su}$, the strictly monotonic drop, which reaches a minimum weight (e.g., zero) at the upper switching threshold intensity $I_{So}$, begins in the upper range of the pixel intensities permissible for the more sensitive detector setting. A short plateau range (not shown) may also be inserted between these two opposite function curves of the more sensitive detector setting.

The second weighting function $G_N$ has a strictly monotonic rise from a minimum percentage weight (e.g., zero) to a maximum percentage weight, which passes over into a plateau up to the maximum pixel intensity, between the lower switching threshold intensity $I_{Su}$ (minimum possible intensity of the less sensitive detector setting) and the upper switching threshold intensity $I_{So}$ (maximum possible intensity of the more sensitive detector setting). The plateau of the second weighting function $G_N$ has a greater percentage weight in this example than the maximum weight of a possible short plateau of the first weighting function $G_H$, because this range does not require such an intense noise suppression.

The weighting functions may also be non-continuous stepped curves in other embodiments. Especially simple variants can thus be embodied.

For example, the detector unit 1 may have, for each pixel of the more sensitive image, a minimum possible intensity and a maximum possible intensity as well as a plurality of first switching threshold intensities (not shown), and the first percentage weighting function $G_H$ may have a first maximum percentage weight for intensities below the first switching threshold intensity and a first reduced percentage weight for intensities above the first switching threshold intensity, another reduced percentage weight above the next switching threshold intensity, etc. The detector unit may correspondingly have, for each pixel of the less sensitive image, a minimum possible intensity and a maximum possible intensity as well as a plurality of second switching threshold intensities (not shown), a second maximum percentage weight as well as a first reduced percentage weight and additional reduced percentage weights for the second percentage weighting function $G_N$.

In all the above-described embodiments, the percentage values of the weights are selected according to practical points of view in order to achieve especially a good noise reduction. At the same time, motion artifacts, such as the dragging of a tail, blurring of the image or development of echoes, shall be counteracted.

By ensuring good averaging by a low percentage weight, for example, at low temperatures (high detector sensitivity), and by ensuring, at the same time, a rapid response of the camera to changes, for example, motion of objects, by a higher percentage weight at higher temperatures, it can be achieved that noise suppression will take place only where the noise causes interference, namely, at low temperatures. At the same time, said motion artifacts, which could occur if one wanted to perform the good averaging for all components of the image, are counteracted.

Independently from the embodiments shown in FIGS. 4a through 4c, at least one of the strictly monotonic drops and rises may be a convex function or a concave function, even if the monotonic drops and rises are represented linearly as a preferred embodiment.

While specific embodiments of the invention have been shown and described in detail to illustrate the application of the principles of the invention, it will be understood that the invention may be embodied otherwise without departing from such principles.

What is claimed is:

1. A thermal imaging camera comprising:
a pixel-based detector unit for a pixel-based recording of thermal radiation of a scene imaged onto same with at least two different sensitivities and alternating reading of more sensitive and less sensitive images;
a processor unit for controlling reading, preprocessing, buffering and linking of at least two more sensitive and less sensitive images read alternatingly from the detector unit into a common output image;
an image buffering unit comprising a common accumulator for both more sensitive and less sensitive original images and with a common output image available at a buffering unit output;

an image weighting unit arranged upstream of the accumulator for a pixel-by-pixel weighting of more sensitive and less sensitive original images read alternatingly from the detector unit and with a settable percentage weighting function and for the pixel-by-pixel weighting of the output image buffered in the accumulator with a weighting function complementary to the settable percentage weighting function as well as for the additive superimposition of the two images for continuous updating of the output image on the basis of original images read alternatingly from the detector unit with at least two different sensitivity settings.

2. A thermal imaging camera in accordance with claim 1, wherein a sequence of more sensitive and less sensitive original images, read alternatingly from the detector unit with more than two different sensitivity settings, is sent to the accumulator in a weighted form, wherein the updating takes place on the basis of the output image made currently available in the accumulator and weighted complementarily, so that a common output image with pixel intensities from original images having at least three different sensitivities is produced in the accumulator.

3. A thermal imaging camera in accordance with claim 1, wherein a sequence of more sensitive and less sensitive original images, read alternatingly consecutively from the detector unit with at least two sensitivity settings, is sent to the accumulator in the weighted form, wherein an updating takes place on the basis of an output image made currently available in the accumulator and weighted complementarily, so that a slidingly averaged output image of the sequence of more sensitive and less sensitive images recorded alternatingly is obtained.

4. A thermal imaging camera in accordance with claim 1, wherein said image weighting unit has an image weighting multiplier for weighting the original image read with the settable percentage weight function, an accumulator weighting multiplier for weighting the output image available from the accumulator with a complementary weighting function as well an adder for a pixel-by-pixel addition of two weighted images, to which the weighted image of the original image read as well as the complementarily weighted output image present in the accumulator are sent, and whose output is followed by the accumulator.

5. A thermal imaging camera in accordance with claim 1, wherein:
said image weighting unit comprises consecutively of a first accumulator adder, to which an original image read from the detector unit with defined sensitivity as well as the output image present in the accumulator are sent in order to form differences pixel by pixel from the original image and the output image, a downstream image weighting multiplier for weighting the differential image thus formed with the settable weighting function, as well as an image adder, to which the weighted differential image from the original image and the output image from the image weighting multiplier and the output image present in the accumulator are sent, in order to perform the complementary weighting of the output image present in the accumulator against the new original image.

6. A thermal imaging camera in accordance with claim 1, wherein the weighting function is different for more sensitive and less sensitive images, wherein a selection unit is provided for making available different weighting functions for an original image read depending on the detector sensitivity set as well as corresponding to adapted complementary weighting functions.

7. A thermal imaging camera in accordance with claim 6, wherein:
said processor unit has means for controlling a weighting of the pixel intensity of each pixel position of a more sensitive image with a first weighting factor of the first percentage weighting function and the weighting of the pixel intensity of each pixel position of one or more less sensitive images with a second weighting factor or additional weighting factors;
first, second and additional weighting functions are applicable in an assigned manner to the different, more sensitive and less sensitive images.

8. A thermal imaging camera in accordance with claim 6, wherein:
based on different sensitivity settings, the detector unit has a minimum possible intensity and a maximum possible intensity for each pixel of a more sensitive image and a minimum possible intensity and a maximum possible intensity for each pixel of a less sensitive image;
the first percentage weighting function has a monotonic drop from a first maximum percentage weight at the minimum possible intensity to a first minimum percentage weight at the maximum possible intensity, and the second or additional percentage weighting function has a monotonic rise from a second minimum percentage weight at the minimum possible intensity to a second maximum percentage weight at the maximum possible intensity.

9. A thermal imaging camera in accordance with claim 8, wherein:
said detector unit has a lower switching threshold intensity between the minimum possible intensity and the maximum possible intensity for each pixel of a more sensitive image and an upper switching threshold intensity between the maximum possible intensity and the minimum possible intensity for each pixel of a less sensitive image;
the first percentage weighting function is essentially constant below the lower switching threshold intensity and has a monotonic drop from a first maximum percentage weight at the lower switching threshold intensity to a first minimum percentage weight at the maximum possible intensity above the lower switching threshold intensity; and
the second percentage weighting function has a monotonic rise from a second minimum percentage weight at the minimum possible intensity to a second maximum percentage weight at the upper switching threshold intensity below the upper switching threshold intensity and is essentially constant above the upper switching threshold intensity.

10. A thermal imaging camera in accordance with claim 8, wherein
said detector unit has a lower switching threshold intensity between the minimum possible intensity and maximum possible intensity for each pixel of a more sensitive image and an upper switching threshold intensity between the maximum possible intensity and minimum possible intensity for each pixel of a less sensitive image;
the first percentage weighting function has a monotonic rise from a first lower minimum percentage weight to a first maximum percentage weight below the lower switching threshold intensity and a monotonic drop from the first maximum percentage weight at the lower switching threshold intensity to a first upper minimum percentage weight at the maximum possible intensity above the lower switching threshold intensity up to the maximum possible intensity, as well as the second percentage weighting function has a monotonic rise from a second lower minimum percentage weight at the minimum possible intensity to a second maximum percentage weight at the upper switching threshold intensity between the minimum possible intensity and the upper switching threshold intensity and a monotonic drop from the second maximum percentage weight at the upper switching threshold intensity to a second upper minimum percentage weight at the maximum possible intensity above the upper switching threshold intensity.

11. A thermal imaging camera in accordance with one of the claim 9, wherein the lower switching threshold intensity is equal to the upper switching threshold intensity.

12. A thermal imaging camera in accordance with one of the claim 8, wherein at least one of the monotonic drops or rises is a convex function.

13. A thermal imaging camera in accordance with claim 8, wherein at least one of the monotonic drops or rises is a linear function.

14. A thermal imaging camera in accordance with claim 8, wherein:

the maximum percentage weight is set at a higher percentage weight for a pixel of a more sensitive or less sensitive image if the difference in the value of the pixel intensity thereof and the intensity of the corresponding pixel in the accumulator is above a shut-off threshold value.

15. A thermal imaging camera in accordance with one of the claim 8, wherein the higher percentage weight is 100%.

16. A thermal imaging camera comprising:

a pixel-based detector unit for a pixel-based recording of thermal radiation, the detector unit having at least two different sensitivities and alternating recording between more sensitive and less sensitive images;

a processor unit for controlling reading, preprocessing, buffering and linking of at least the more sensitive and the less sensitive images recorded alternatingly from the detector unit into a common output image;

an image buffering unit comprising a common accumulator receiving both the more sensitive and the less sensitive images and providing a common output image available at a buffering unit output;

an image weighting unit arranged upstream of the accumulator and with a settable percentage weighting function and for a pixel-by-pixel weighting of the recorded more sensitive and the less sensitive images prior to being buffered in the accumulator and for the additive superimposition of the weighted more sensitive and the less sensitive images and for continuous updating of the output image on the basis of the recorded more sensitive and the less sensitive images.

17. A thermal imaging camera in accordance with claim 16, wherein a sequence of more sensitive and less sensitive recorded alternatingly from the detector unit is sent to the accumulator in a weighted form, wherein the updating takes place on the basis of the output image made currently available in the accumulator and weighted complementarily, so that a common output image with pixel intensities from original images having at least three different sensitivities is produced in the accumulator.

18. A thermal imaging camera in accordance with claim 16, wherein a sequence of more sensitive and less sensitive original images is sent to the accumulator in the weighted form, wherein an updating takes place on the basis of an output image made currently available in the accumulator and weighted complementarily, so that a slidingly averaged output image of the sequence of more sensitive and less sensitive images recorded alternatingly is obtained.

19. A thermal imaging camera in accordance with claim 16, wherein said image weighting unit has an image weighting multiplier for weighting the recorded more sensitive and the less sensitive images with the settable percentage weight function, an accumulator weighting multiplier for weighting the output image available from the accumulator with a complementary weighting function as well an adder for a pixel-by-pixel addition of two weighted images, to which the weighted image of the recorded more sensitive and the less sensitive images as well as the complementarily weighted output image present in the accumulator are sent, and whose output is followed by the accumulator.

20. A thermal imaging camera in accordance with claim 16, wherein:

said image weighting unit comprises consecutively of a first accumulator adder, to which an original image read from the detector unit with defined sensitivity as well as the output image present in the accumulator are sent in order to form differences pixel by pixel from the original image and the output image, a downstream image weighting multiplier for weighting the differential image thus formed with the settable weighting function, as well as an image adder, to which the weighted differential image from the original image and the output image from the image weighting multiplier and the output image present in the accumulator are sent, in order to perform the complementary weighting of the output image present in the accumulator against the new original image.

* * * * *